United States Patent
Cummings et al.

(10) Patent No.: US 8,004,504 B2
(45) Date of Patent: Aug. 23, 2011

(54) REDUCED CAPACITANCE DISPLAY ELEMENT

(75) Inventors: William J. Cummings, Millbrae, CA (US); Brian J. Gally, Los Gatos, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 1081 days.

(21) Appl. No.: 11/155,939

(22) Filed: Jun. 17, 2005

(65) Prior Publication Data

US 2006/0077153 A1    Apr. 13, 2006

Related U.S. Application Data

(60) Provisional application No. 60/613,542, filed on Sep. 27, 2004, provisional application No. 60/613,488, filed on Sep. 27, 2004.

(51) Int. Cl.
*G06F 3/038* (2006.01)

(52) U.S. Cl. ............ 345/204; 345/84; 345/85; 359/212; 359/224

(58) Field of Classification Search .................. 345/204, 345/84, 85; 359/212, 224, 530, 555, 556, 359/584, 585
See application file for complete search history.

(56) References Cited

U.S. PATENT DOCUMENTS

| | | | |
|---|---|---|---|
| 2,518,647 A | 8/1950 | Teeple et al. | |
| 3,656,836 A | 4/1972 | de Cremoux et al. | |
| 4,377,324 A | 3/1983 | Durand | |
| 4,403,248 A | 9/1983 | Te Velde | |
| 4,441,791 A | 4/1984 | Hornbeck | |
| 4,459,182 A | 7/1984 | Te Velde | |
| 4,566,935 A | 1/1986 | Hornbeck | |
| 4,596,992 A | 6/1986 | Hornbeck | |
| 4,615,595 A | 10/1986 | Hornbeck | |
| 4,662,746 A | 5/1987 | Hornbeck | |
| 4,705,361 A | 11/1987 | Frazier et al. | |
| 4,710,732 A | 12/1987 | Hornbeck | |
| 4,786,128 A | 11/1988 | Birnbach | |

(Continued)

FOREIGN PATENT DOCUMENTS

DE    102 28 946    1/2004

(Continued)

OTHER PUBLICATIONS

Aratani, et al. "Surface micromachined tunable interometer array." 8253A Sensors and Actuators—A Physical A43 (May 1994), Nos. 1/3, Lausanne, CH.

(Continued)

*Primary Examiner* — Kimnhung Nguyen
(74) *Attorney, Agent, or Firm* — Knobbe, Martens, Olson & Bear, LLP

(57) ABSTRACT

A display element, such as an interferometric modulator, comprises a transparent conductor configured as a first electrode and a movable mirror configured as a second electrode. Advantageously, the partial reflector is positioned between the transparent conductor and the movable mirror. Because the transparent conductor serves as an electrode, the partial reflector does not need to be conductive. Accordingly, a greater range of materials may be used for the partial reflector. In addition, a transparent insulative material, such as a dielectric, may be positioned between the transparent conductor and the partial reflector in order to decrease a capacitance of the display element without changing a gap distance between the partial reflector and the movable mirror. Thus, a capacitance of the display element may be reduced without changing the optical characteristics of the display element.

45 Claims, 10 Drawing Sheets

U.S. PATENT DOCUMENTS

| | | | |
|---|---|---|---|
| 4,822,993 A | 4/1989 | Dillon et al. | |
| 4,974,942 A | 12/1990 | Gross | |
| 4,982,184 A | 1/1991 | Kirkwood | |
| 4,985,312 A * | 1/1991 | Furuya et al. | 428/627 |
| 5,028,939 A | 7/1991 | Hornbeck et al. | |
| 5,061,049 A | 10/1991 | Hornbeck | |
| 5,151,585 A | 9/1992 | Siebert | |
| 5,500,761 A | 3/1996 | Goosen et al. | |
| 5,559,358 A | 9/1996 | Burns et al. | |
| 5,578,976 A | 11/1996 | Yao | |
| 5,654,819 A | 8/1997 | Goossen | |
| 5,710,656 A | 1/1998 | Goossen | |
| 5,757,536 A | 5/1998 | Ricco et al. | |
| 5,818,095 A | 10/1998 | Sampsell | |
| 5,835,255 A | 11/1998 | Miles | |
| 5,853,310 A | 12/1998 | Nishimura | |
| 5,914,803 A | 6/1999 | Hwang et al. | |
| 5,914,804 A | 6/1999 | Goossen | |
| 5,920,421 A | 7/1999 | Choi | |
| 5,986,796 A | 11/1999 | Miles | |
| 6,031,653 A | 2/2000 | Wang et al. | |
| 6,038,056 A | 3/2000 | Florence et al. | |
| 6,040,937 A | 3/2000 | Miles | |
| 6,046,840 A | 4/2000 | Huibers | |
| 6,055,090 A | 4/2000 | Miles | |
| 6,056,406 A | 5/2000 | Park et al. | |
| 6,088,102 A | 7/2000 | Manhart | |
| 6,195,196 B1 | 2/2001 | Kimura | |
| 6,211,976 B1 | 4/2001 | Popovich | |
| 6,282,010 B1 | 8/2001 | Sulzbach et al. | |
| 6,301,000 B1 | 10/2001 | Johnson | |
| 6,323,987 B1 | 11/2001 | Rinuado | |
| 6,356,378 B1 | 3/2002 | Huibers | |
| 6,400,738 B1 | 6/2002 | Tucker | |
| 6,447,126 B1 | 9/2002 | Hornbeck | |
| 6,538,748 B1 | 3/2003 | Tucker et al. | |
| 6,603,520 B2 | 8/2003 | Umemoto | |
| 6,631,998 B2 | 10/2003 | Egawa et al. | |
| 6,650,455 B2 | 11/2003 | Miles | |
| 6,652,109 B2 | 11/2003 | Nakamura | |
| 6,674,562 B1 | 1/2004 | Miles | |
| 6,680,792 B2 | 1/2004 | Miles | |
| 6,760,146 B2 | 7/2004 | Ikeda et al. | |
| 6,768,522 B2 | 7/2004 | Yasukawa et al. | |
| 6,768,555 B2 | 7/2004 | Chen | |
| 6,822,780 B1 | 11/2004 | Long | |
| 6,822,798 B2 | 11/2004 | Wu et al. | |
| 6,867,896 B2 | 3/2005 | Miles | |
| 6,882,458 B2 | 4/2005 | Lin et al. | |
| 6,903,487 B2 | 6/2005 | Shreeve et al. | |
| 6,912,022 B2 | 6/2005 | Lin | |
| 6,958,847 B2 | 10/2005 | Lin | |
| 6,970,031 B1 | 11/2005 | Martin | |
| 6,972,889 B2 | 12/2005 | Goodwin-Johansson et al. | |
| 6,995,890 B2 | 2/2006 | Lin et al. | |
| 6,999,225 B2 | 2/2006 | Lin et al. | |
| 6,999,236 B2 | 2/2006 | Lin et al. | |
| 7,016,095 B2 | 3/2006 | Lin | |
| 7,038,752 B2 | 5/2006 | Lin | |
| 7,042,643 B2 | 5/2006 | Miles | |
| 7,099,058 B2 | 8/2006 | Takemori et al. | |
| 7,113,339 B2 | 9/2006 | Taguchi et al. | |
| 7,123,216 B1 | 10/2006 | Miles | |
| 7,126,738 B2 | 10/2006 | Miles | |
| 7,138,984 B1 | 11/2006 | Miles | |
| 7,304,784 B2 | 12/2007 | Chui | |
| 7,324,248 B2 | 1/2008 | Brotherton-Ratcliffe et al. | |
| 7,342,705 B2 | 3/2008 | Chui et al. | |
| 7,342,709 B2 | 3/2008 | Lin | |
| 7,369,294 B2 | 5/2008 | Gally | |
| 7,372,613 B2 | 5/2008 | Chui et al. | |
| 7,417,735 B2 | 8/2008 | Cummings | |
| 7,460,291 B2 | 12/2008 | Sampsell | |
| 7,498,621 B2 | 3/2009 | Seitz | |
| 7,508,571 B2 | 3/2009 | Gally | |
| 7,561,323 B2 | 7/2009 | Gally | |
| 7,564,612 B2 | 7/2009 | Chui | |
| 7,630,123 B2 | 12/2009 | Kothari | |
| 7,710,632 B2 | 5/2010 | Cummings | |
| 7,710,636 B2 | 5/2010 | Chui | |
| 7,855,824 B2 | 12/2010 | Gally | |
| 7,898,521 B2 | 3/2011 | Gally | |
| 7,907,319 B2 | 3/2011 | Miles | |
| 2002/0075555 A1 | 6/2002 | Miles | |
| 2003/0043157 A1 | 3/2003 | Miles | |
| 2003/0206281 A1 | 11/2003 | Jain | |
| 2003/0214621 A1 | 11/2003 | Kim | |
| 2004/0008438 A1 | 1/2004 | Sato | |
| 2004/0027671 A1 | 2/2004 | Wu et al. | |
| 2004/0027701 A1 | 2/2004 | Ishikawa | |
| 2004/0051929 A1 | 3/2004 | Sampsell | |
| 2004/0066477 A1 | 4/2004 | Morimoto | |
| 2004/0070569 A1 * | 4/2004 | Muthuswamy et al. | 345/169 |
| 2004/0141113 A1 * | 7/2004 | Yun | 349/113 |
| 2004/0175577 A1 | 9/2004 | Lin et al. | |
| 2004/0188599 A1 | 9/2004 | Viktorovitch et al. | |
| 2004/0217264 A1 | 11/2004 | Wood | |
| 2005/0212738 A1 | 9/2005 | Gally | |
| 2005/0219218 A1 * | 10/2005 | Harman | 345/169 |
| 2006/0044291 A1 * | 3/2006 | Willis | 345/204 |
| 2006/0066511 A1 | 3/2006 | Chui | |
| 2006/0066541 A1 | 3/2006 | Gally | |
| 2006/0066935 A1 | 3/2006 | Cummings et al. | |
| 2006/0067600 A1 | 3/2006 | Gally | |
| 2006/0067633 A1 | 3/2006 | Gally | |
| 2006/0077123 A1 | 4/2006 | Gally | |
| 2006/0077154 A1 | 4/2006 | Gally | |
| 2006/0274400 A1 | 12/2006 | Miles | |
| 2007/0092728 A1 | 4/2007 | Ouderkirk et al. | |
| 2007/0097694 A1 | 5/2007 | Faase | |
| 2007/0115415 A1 | 5/2007 | Piehl | |
| 2007/0195392 A1 | 8/2007 | Phillips et al. | |
| 2007/0236774 A1 | 10/2007 | Gousev | |
| 2008/0055706 A1 | 3/2008 | Chui et al. | |
| 2009/0059346 A1 | 3/2009 | Xu | |
| 2009/0219604 A1 | 9/2009 | Miles | |
| 2010/0165443 A1 | 7/2010 | Chui | |
| 2010/0214642 A1 | 8/2010 | Miles | |
| 2010/0245975 A1 | 9/2010 | Cummings | |

FOREIGN PATENT DOCUMENTS

| | | |
|---|---|---|
| EP | 0 278 038 | 8/1988 |
| EP | 0 667 548 | 8/1995 |
| EP | 0 667 548 A | 8/1995 |
| EP | 0 786 911 | 7/1997 |
| EP | 1 800 172 B1 | 2/2001 |
| EP | 1 640 767 | 3/2006 |
| EP | 2 030 947 | 3/2009 |
| EP | 2 256 537 | 12/2010 |
| JP | 02-068513 | 3/1990 |
| JP | 03-199920 | 8/1991 |
| JP | 08 018990 | 1/1996 |
| JP | 10 500224 | 1/1998 |
| JP | 11 211999 | 8/1999 |
| JP | 2000 500245 | 1/2000 |
| JP | 2003 195201 | 7/2003 |
| JP | 2004-012642 | 1/2004 |
| JP | 2004-212922 | 7/2004 |
| JP | 2005-157133 | 6/2005 |
| WO | WO 95/30924 A | 11/1995 |
| WO | WO 97/17628 A | 5/1997 |
| WO | WO 03/007049 | 1/2003 |
| WO | WO 2005/093488 | 10/2005 |
| WO | WO 2006-036386 | 4/2006 |
| WO | WO 2006/036495 | 4/2006 |
| WO | WO 2006/036540 | 4/2006 |
| WO | WO 2006/036588 | 4/2006 |
| WO | WO2009/032525 | 3/2009 |

OTHER PUBLICATIONS

International Search Report for PCT/US2005/032020, *International Searching Authority*, Dec. 12, 2005.

Miles, M.W., "A Mems Based Interferometric Modulator (IMOD) for Display Applications," Proceedings of Sensors Expo, Oct. 21, 1997, pp. 281-284.

International Preliminary Report on Patentability and Written Opinion in PCT/US2005/032020 dated Apr. 5, 2007.
Official Communication in Chinese Patent Application No. 200580032119.6 dated Jun. 6, 2008.
Official Communication in Chinese Patent Application No. 200580032119.6 dated Feb. 6, 2009.
Official Communication in Malaysian Patent Application No. PI 20054361 dated Nov. 28, 2008.
Extended European Search Report in App. No. 08153441.4 dated Mar. 25, 2009.
International Search Report and Written Opinion in PCT/US2008/073610 dated Apr. 6, 2009.
Gally, "Wide-Gamut Color Reflective Displays Using iMOD Interference Technology," SID 04 Digest, pp. 654-657, 2004.
Miles, M., et. al., "Digital Paper™ for reflective displays," Journal of the Society for Information Display, Society for Information Display, San Jose, US, vol. 11, No. 1, 2003, pp. 209-215.
Austrian Search Report in U.S. Appl. No. 11/036,966 dated Jul. 28, 2005.
International Search Report and Written Opinion in PCT/US2005/033056(International Publication No. WO 2006/036588) dated Jan. 30, 2006.
International Search Report and Written Opinion in International Patent Application No. PCT/US2005/005896 (International Publication No. WO 2005/093488) dated Jun. 7, 2005.
International Preliminary Report on Patentability in Application No. PCT/US2008/073610, dated Nov. 11, 2009.
Office Action in Chinese Application No. 200580032119.6 dated Mar. 30, 2010.
International Preliminary Report on Patentability and Written Opinion in PCT/US2008/073610 (International Pub. No. WO 2009/032525) dated Nov. 30, 2009.
Austrian Search Report for U.S. Appl. No. 11/051,258 dated May 13, 2005.
Extended European Search Report in App. No. 05255657.8 (Publication No. EP 1640767) dated Dec. 7, 2005.
Extended European Search Report in Application No. 10176512.1 dated Oct. 22, 2010.
Office Action in U.S. Appl. No. 11/051,258 dated Nov. 22, 2006.
Amendment to Office Action in U.S. Appl. No. 11/051,258 dated Feb. 22, 2007.
Office Action in U.S. Appl. No. 11/051,258 dated May 18, 2007.
Request for Continued Examination, Information Disclosure Statement, and Response to Office Action in U.S. Appl. No. 11/051,258 dated Aug. 17, 2007.
Interview Summary in U.S. Appl. No. 11/051,258 dated Aug. 23, 2007.
Supplemental Amendment in U.S. Appl. No. 11/051,258 dated Oct. 10, 2007.
Office Action in U.S. Appl. No. 11/051,258 dated Jan. 3, 2008.
Interview Summary in U.S. Appl. No. 11/051,258 dated Apr. 18, 2008.
Amendment and Response in U.S. Appl. No. 11/051,258 dated May 5, 2008.
Notice of Allowance U.S. Appl. No. 11/051,258 dated Jun. 17, 2008.
Request for Continued Examination and Information Disclosure Statement in U.S. Appl. No. 11/051,258 dated Sep. 16, 2008.
Notice of Allowance U.S. Appl. No. 11/051,258 dated Oct. 10, 2008.
Request for Continued Examination and Information Disclosure Statement in U.S. Appl. No. 11/051,258 dated Jan. 8, 2009.
Office Action in U.S. Appl. No. 11/051,258 dated Feb. 3, 2009.
Interview Summary in U.S. Appl. No. 11/051,258 dated Feb. 18, 2009.
Amendment in U.S. Appl. No. 11/051,258 dated May 4, 2009.
Notice of Allowance in U.S. Appl. No. 11/051,258 dated Jul. 13, 2009.
Issue Notification in U.S. Appl. No. 11/051,258, dated Nov. 11, 2009.
Request for Continued Examination, Petition to Withdraw from Issue, and Information Disclosure Statement in U.S. Appl. No. 11/051,258, dated Nov. 24, 2009.
Petition Decision—Grant—Notice of withdrawal from issue in U.S. Appl. No. 11/051,258, dated Nov. 25, 2009.
Notice of Allowance in U.S. Appl. No. 11/051,258, dated Dec. 17, 2009.
Preliminary Amendment in U.S. Appl. No. 12/625,461, dated Jun. 10, 2010.
Notice of Allowance in U.S. Application No. 12/625,461, dated Dec. 16, 2010.
Official Communication in Chinese Application No. 2005101035579 dated May 9, 2008.
Office Action in European Application No. EP 05255657 dated Oct. 12, 2006.
Office Action in European Application No. 05 255 657, dated Mar. 2, 2010.
Office Action in Japanese Application No. 2005-235802 dated Sep. 9, 2008.
Decision of Rejection in Japanese Application No. 2005-235802, dated Nov. 4, 2009.
Official Communication in Mexican Application No. PA/a/2005/009406 dated May 6, 2008.
International Search Report and Written Opinion in PCT/US2005/032633 ( International Publication No. WO 2006/036540) dated Feb. 6, 2006.
International Preliminary Report and Written Opinion in PCT/US2005/032633 (International Publication No. WO 2006/036540) dated Apr. 5, 2007.
Preliminary Amendment in U.S. Appl. No. 12/642,750, dated May 12, 2010.
Notice of Allowance in U.S. Appl. No. 12/642,750, dated Sep. 20, 2010.
Request for Continued Examination, Amendment and Information Disclosure Statement in U.S. Appl. No. 12/642,750, dated Dec. 17, 2010.
Office Action in U.S. Appl. No. 12/360,005 mailed Apr. 22, 2010.
Amendment in U.S. Appl. No. 12/360,005 mailed Oct. 21, 2010.
Office Action in U.S. Appl. No. 12/360,005, dated Jan. 7, 2011.
Amendment in U.S. Appl. No. 12/360,005 dated Mar. 7, 2011.
Office Action in U.S. Appl. No. 11/213,659 dated Oct. 29, 2008.
Amendment and Response in U.S. Appl. No. 11/213,659 dated Mar. 30, 2009.
Notice of Allowance in U.S. Appl. No. 11/213,659 dated Jul. 20, 2009.
Request for Continued Examination (RCE) and Information Disclosure Statement in U.S. Appl. No. 11/213,659, dated Oct. 19, 2009.
Notice of Allowance and Fees Due in U.S. Appl. No. 11/213,659, dated Nov. 18, 2009.
Request for Continued Examination (RCE) and Information Disclosure Statement in U.S. Appl. No. 11/216,659, dated Feb. 17, 2010.
Amendment and Information Disclosure Statement in U.S. Appl. No. 11/213,659, dated Feb. 25, 2010.
Notice of Allowance in U.S. Appl. No. 11/213,659, dated Apr. 8, 2010.
Request for Continued Examination (RCE), Information Disclosure Statement, and Petition to Withdraw from Issue in U.S. Appl. No. 11/213,659, dated Aug. 18, 2010.
Petition Grant in U.S. Appl. No. 11/213,659, dated Aug. 19, 2010.
Amendment in U.S. Appl. No. 11/213,659, dated Aug. 27, 2010.
Notice of Allowance in U.S. Appl. No. 11/213,659, dated Sep. 21, 2010.
Application as Filed in U.S. Appl. No. 12/831,517, dated Jul. 7, 2010.
Application as Filed in U.S. Appl. No. 13/016,107, dated Jan. 28, 2011.
Office Action in European Application No. EP 05800920.0 dated May 21, 2008.
Summons to attend oral proceedings in European Application No. 05800920, dated Dec. 4, 2009.
Result of consultation in European Application No. 05800920, dated Feb. 23, 2010.
Minutes of the Oral Proceedings in European Application No. 05 800 920.1, dated May 20, 2010.
Notice of Intention to Grant in European Application No. 05800920, dated Jun. 2, 2010.
Non-Final Rejection in U.S. Appl. No. 08/688,710, dated Dec. 2, 1996.

Response after Non-Final Action in U.S. Appl. No. 08/688,710, dated Jun. 2, 1997.
Final Rejection in U.S. Appl. No. 08/688,710, dated Sep. 16, 1997.
Amendment after Final Rejection in U.S. Appl. No. 08/688,710, dated Dec. 19, 1997.
Notice of Appeal from the Examiner to the Board of Patents Appeals and Interferences in U.S. Appl. No. 08/688,710, dated Mar. 16, 1998.
Advisory Action in U.S. Appl. No. 08/688,710, dated Apr. 7, 1998.
Non-Final Rejection in U.S. Appl. No. 08/688,710, dated Jun. 25, 1998.
Response after Non-Final Action in U.S. Appl. No. 08/688,710, dated Dec. 23, 1998.
Notice of Allowance in U.S. Appl. No. 08/688,710, dated Mar. 5, 1999.
Amendment after Notice of Allowance (Rule 312) in U.S. Appl. No. 08/688,710, dated Jun. 2, 1999.
Preliminary Amendment in U.S. Appl. No. 08/688,710, dated Jun. 9, 1999.
Response to 312 Amendment (PTO-271) in U.S. Appl. No. 08/688,710, dated Jun. 17, 1999.
Notice of Allowance in U.S. Appl. No. 08/688,710, dated Sep. 23, 1999.
Official Communication in Japanese Application No. 9-518276, dated Apr. 11, 2006.
Official Communication in Japanese Application No. 9-518276, dated Feb. 27, 2007.
Official Communication in Japanese Application No. 9-518276, dated Apr. 14, 2009.
Office Action in U.S. Appl. No. 11/433,294 dated Mar. 17, 2008.
Response to Office Action in U.S. Appl. No. 11/433,294 dated Jul. 17, 2008.
Final Office Action in U.S. Appl. No. 11/433,294 dated Dec. 26, 2008.
Request for Continued Examination and Response to Final Office Action in U.S. Appl. No. 11/433,294 dated Mar. 26, 2009.
Notice of Allowance in U.S. Appl. No. 11/433,294 dated Apr. 9, 2009.
Request for Continued Examination and Information Disclosure Statement in U.S. Appl. No. 11/433,294 dated Jul. 8, 2009.
Notice of Allowance in U.S. Appl. No. 11/433,294 dated Sep. 21, 2009.
Request for Continued Examination and Preliminary Amendment in U.S. Appl. No. 11/433,294 dated Dec. 21, 2009.
Interview Summary in U.S. Appl. No. 11/433,294 dated Feb. 8, 2010.
Notice of Allowance in U.S. Appl. No. 11/433,294 dated Feb. 23, 2010.
Request for Continued Examination and Information Disclosure Statement in U.S. Appl. No. 11/433,294, dated May 24, 2010.
Preliminary Amendment in U.S. Patent Appl. No. 11/433,294, dated Jun. 3, 2010.
Notice of Allowance in U.S. Appl. No. 11/433,294 dated Jun. 28, 2010.
Request for Continued Examination and Information Disclosure Statement in U.S. Appl. No. 11/433,294, dated Sep. 27, 2010.
Notice of Allowance in U.S. Appl. No. 11/433,294, dated Oct. 18, 2010.
Issue Fee, Amendment After Allowance Under 37 C.F.R. § 1.312, and Information Disclosure Statement in U.S. Appl. No. 11/433,294, dated Jan. 14, 2011.
Response to Rule 312 Communication in U.S. Appl. No. 11/433,294, dated Jan. 26, 2011.
International Search Report and Written Opinion in PCT/US2005/029822, dated Dec. 28, 2005.
International Preliminary Report on Patentability in PCT/US2005/029822, dated Apr. 5, 2007.
Office Action in U.S. Appl. No. 11/187,129, dated May 4, 2007.
Amendment in U.S. Appl. No. 11/187,129, dated Jul. 3, 2007.
Notice of Allowance in U.S. Appl. No. 11/187,129, dated Jul. 18, 2007.
Issue Fee Payment and Amendment Under 37 C.F.R § 1.312 and Comments on Statement of Reason for Allowance in U.S. Appl. No. 11/187,129, dated Oct. 18, 2007.
Response to Rule 312 Communication in U.S. Appl. No. 11/187,129, dated Nov. 1, 2007.
Office Action in U.S. Appl. No. 11/937,437, dated Dec. 30, 2009.
Response to Office Action in U.S. Appl. No. 11/937,437, dated Mar. 29, 2010.
Notice of Allowance in U.S. Appl. No. 11/937,437, dated Jun. 29, 2010.
Request for Continued Examination and Information Disclosure Statement in U.S. Appl. No. 11/937,437, dated Aug. 26, 2010.
Notice of Allowance in U.S. Appl. No. 11/937,437, dated Oct. 18, 2010.
Request for Continued Examination and Information Disclosure Statement in U.S. Appl. No. 11/937,437, dated Jan. 13, 2011.
Office Action dated Mar. 14, 2008 in Chinese Application No. 200580031 0558,.
Office Action dated Feb. 27, 2009 in Chinese Application No. 200580031 0558.
Official Communication dated Oct. 31, 2007 in European Application No. 05798393.4.
Official Communication dated Jun. 12, 2009 in European Application No. 05798393.4.
Official Communication in European Application No. 05798393, dated Jun. 8, 2010.
Official Communication in European Application No. 05798393, dated Dec. 29, 2010.
Examination Report in Singapore Application No. 200701863-3, Apr. 30, 2009.
Notice of Reasons for Rejection in Japanese Application No. 2007-533476, dated Oct. 6, 2009.
Notice of Reasons for Rejection in Japanese Application No. 2007-533476, dated Feb. 16, 2010.
Notice of Reasons for Rejection in Japanese Application No. 2007-533476, dated Jun. 8, 2010.
Substantive Examination Report in Application No. PI 20054182, dated Jan. 15, 2010.
Official Communication in Mexican Application No. MX/a/2007/003602, dated 17 Jun. 2009.
Office Action in Application No. 2007110165/28, dated Nov. 23, 2009.
Request for Continued Examination and Information Disclosure Statement in U.S. Appl. No. 12/625,461, dated Mar. 15, 2011.
Supplemental Amendment in U.S. Appl. No. 12/625,461, dated Apr. 1, 2011.
Notice of Abandonment in U.S. Appl. No. 12/831,517, dated Mar. 28, 2011.
Preliminary Amendment in U.S. Appl. No. 13/016,107, dated Apr. 25, 2011.
Second Preliminary Amendment in U.S. Appl. No. 13/016,107, dated May 24, 2011.
Notice of Allowance in U.S. Appl. No. 12/360,005 dated Mar. 25, 2011.
Notice of Allowance in U.S. Appl. No. 12/642,750, dated Apr. 4, 2011.
Notice of Allowance in U.S. Appl. No. 11/847,205 dated Apr. 8, 2011.

* cited by examiner

REDUCED CAPACITANCE DISPLAY ELEMENT

RELATED APPLICATIONS

This application claims priority under 35 U.S.C. §119 (e) to U. S. Provisional Application Ser. No. 60/613,542, filed on Sep. 27, 2004, and U. S. Provisional Application Ser. No. 60/613,488, filed on Sep. 27, 2004, which are hereby expressly incorporated by reference in their entireties.

FIELD OF THE INVENTION

The field of the invention relates to microelectromechanical systems (MEMS).

DESCRIPTION OF THE RELATED TECHNOLOGY

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY OF CERTAIN EMBODIMENTS

The systems, methods, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

In one embodiment, a display element comprises a substantially transparent conductive layer, a partially reflective insulator, and a moveable reflective layer, the partially reflective insulator being positioned between the conductive layer and the moveable reflective layer, wherein a voltage applied between the conductive layer and the moveable reflective layer induces movement of the moveable reflective layer.

In another embodiment, a method of fabricating a display element comprises forming a substantially transparent conductive layer, forming a partially reflective insulator, and forming a moveable reflective layer, the partially reflective insulator being positioned between the conductive layer and the moveable reflective layer, wherein a voltage applied between the conductive layer and the moveable reflective layer induces movement of the moveable reflective layer.

In another embodiment, a display element may be fabricated by the process of forming a substantially transparent conductive layer, forming a partially reflective insulator, and forming a moveable reflective layer, the partially reflective insulator being positioned between the conductive layer and the moveable reflective layer, wherein a voltage applied between the conductive layer and the moveable reflective layer induces movement of the moveable reflective layer.

In one embodiment, a display element comprises means for forming a substantially transparent conductive layer, means for forming a partially reflective insulator, and means for forming a moveable reflective layer, the partially reflective insulator being positioned between the conductive layer and the moveable reflective layer, wherein a voltage applied between the conductive layer and the moveable reflective layer induces movement of the moveable reflective layer.

In another embodiment, a display system comprises a plurality of display elements, each of the display elements comprising, a substantially transparent conductive layer, a partially reflective insulator, and a moveable reflective layer, the partially reflective insulator being positioned between the conductive layer and the moveable reflective layer, wherein a voltage applied between the conductive layer and the moveable reflective layer induces movement of the moveable reflective layer. The display system further comprises a display, a processor that is in electrical communication with the display, the processor being configured to process image data, and a memory device in electrical communication with the processor.

In another embodiment, a display element comprises a substantially transparent conductive layer, a dielectric layer, a partially reflective layer, wherein the dielectric layer is positioned between the conductive layer and the partially reflective layer, and a moveable reflective layer, wherein a voltage applied between the conductive layer and the moveable reflective layer induces movement of the moveable reflective layer.

In another embodiment, a method of fabricating a low capacitance display element comprises forming a substantially transparent conductive layer, forming a dielectric layer forming a partially reflective layer, the dielectric layer being positioned between the conductive layer and the partially reflective layer, and forming a moveable reflective layer, the moveable reflective layer being separated from the partially reflective layer by a gap, wherein a voltage applied between the conductive layer and the moveable reflective layer induces movement of the moveable reflective layer.

In another embodiment, a display element comprises a substantially transparent conductive layer, a dielectric layer, a partially reflective layer, the dielectric layer being positioned between the conductive layer and the partially reflective layer, and a moveable reflective layer, the moveable reflective layer being separated from the partially reflective layer by a gap, wherein when the display element is in an actuated state, the display element appears white to a viewer and in a released state the display element appears black non-white to the viewer.

DETAILED DESCRIPTION OF CERTAIN EMBODIMENTS

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Figure 1:
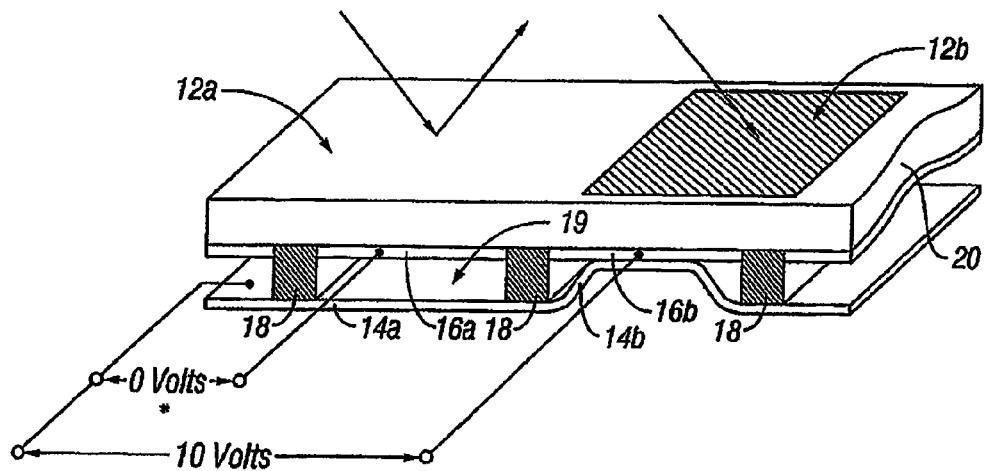
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise of several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. In some embodiments, the layers are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the cavity 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5 illustrate one exemplary process and system for using an array of interferometric modulators in a display application.

Figure 2:
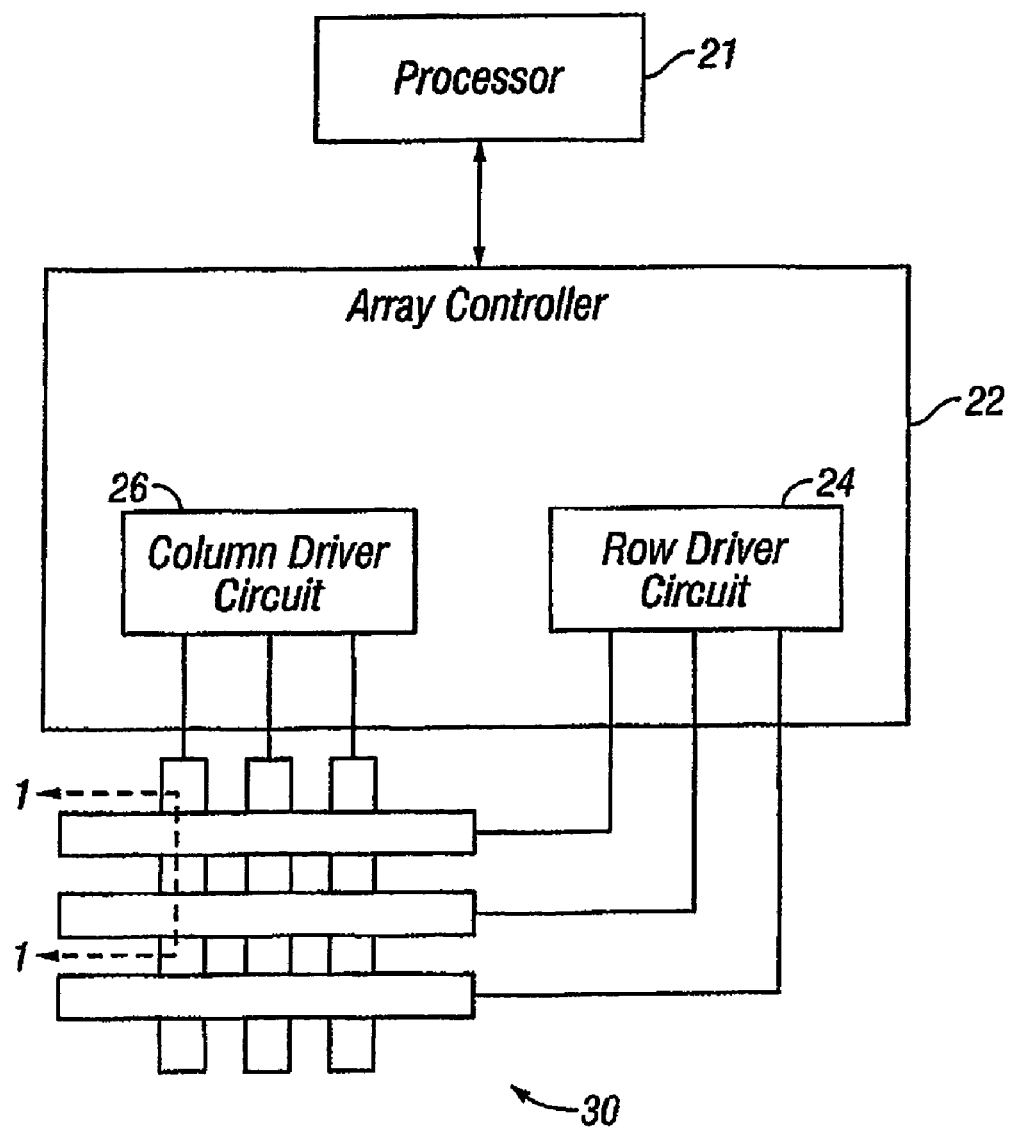
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
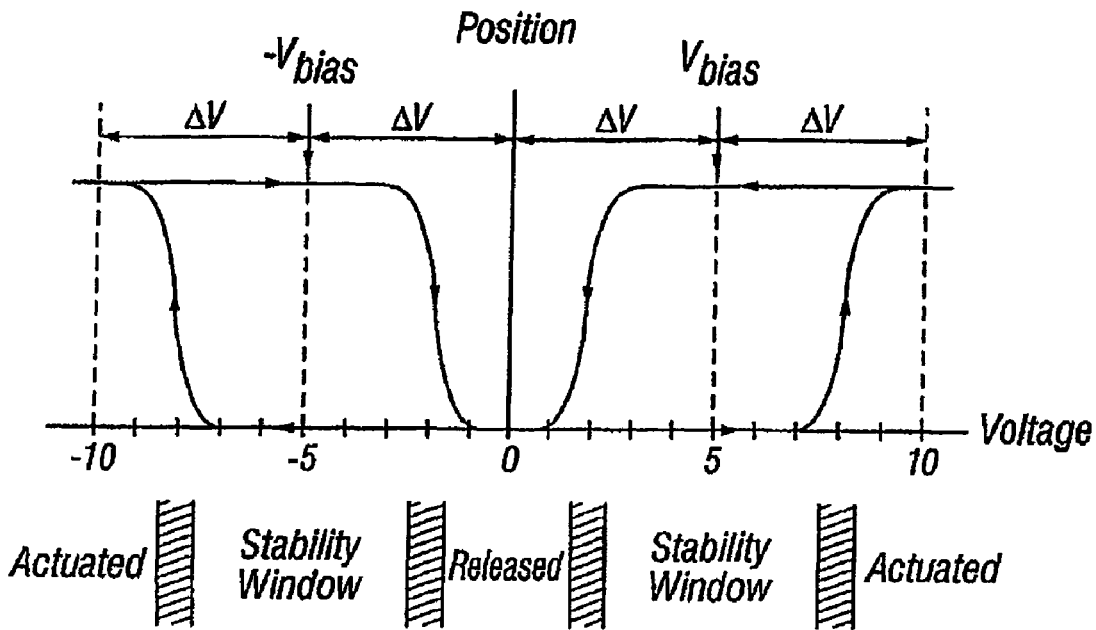
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to −Vbias, and the appropriate row to +ΔV, which may correspond to −5 volts and +5 volts respectively Relaxing the pixel is accomplished by setting the appropriate column to +Vbias, and the appropriate row to the same +ΔV, producing a zero volt potential difference across the pixel. In those rows where the row voltage is held at zero volts, the pixels are stable in whatever state they were originally in, regardless of whether the column is at +Vbias, or −Vbias. As is also illustrated in FIG. 4, it will be appreciated that voltages of opposite polarity than those described above can be used, e.g., actuating a pixel can involve setting the appropriate column to +Vbias, and the appropriate row to −ΔV. In this embodiment, releasing the pixel is accomplished by setting the appropriate column to −Vbias, and the appropriate row to the same −ΔV, producing a zero volt potential difference across the pixel. As is also illustrated in FIG. 4, it will be appreciated that voltages of opposite polarity than those described above can be used, e.g., actuating a pixel can involve setting the appropriate column to +Vbias, and the appropriate row to −ΔV. In this embodiment, releasing the pixel is accomplished by setting the appropriate column to −Vbias, and the appropriate row to the same −ΔV, producing a zero volt potential difference across the pixel.

Figure 5A:
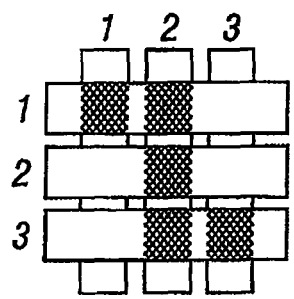
FIGS. 5A and 5B illustrate one exemplary timing diagram for row and column signals that may be used to write a frame of display data to the 3×3 interferometric modulator display of FIG. 2.
Figure 5B:
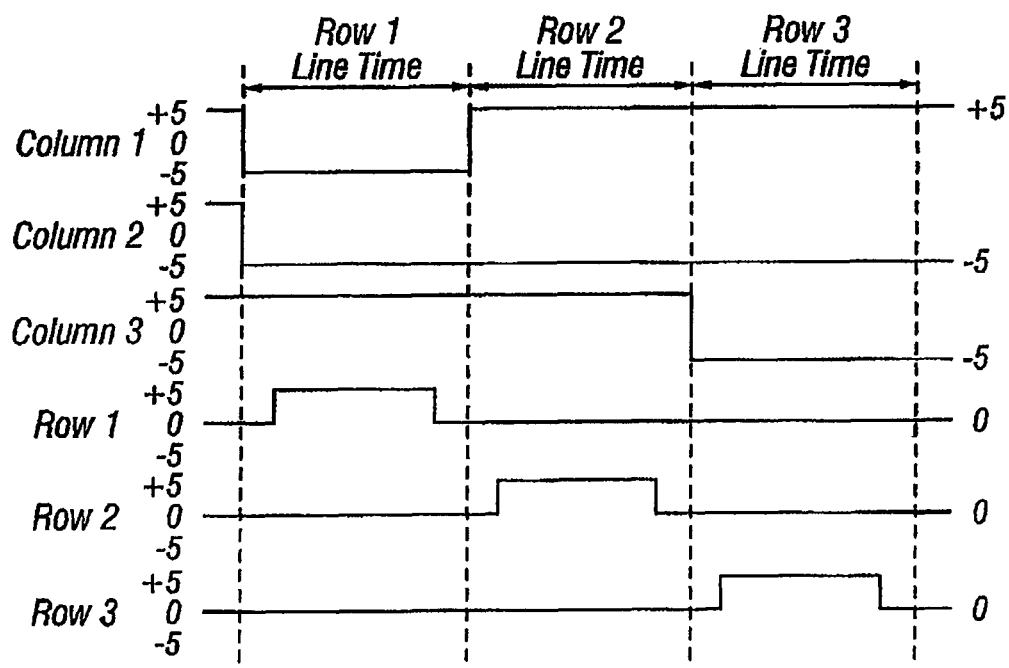

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
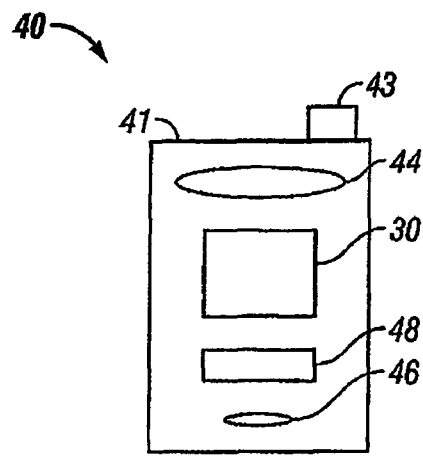
FIGS. 6A and 6B are system block diagrams illustrating an embodiment of a visual display device comprising a plurality of interferometric modulators.
Figure 6B:
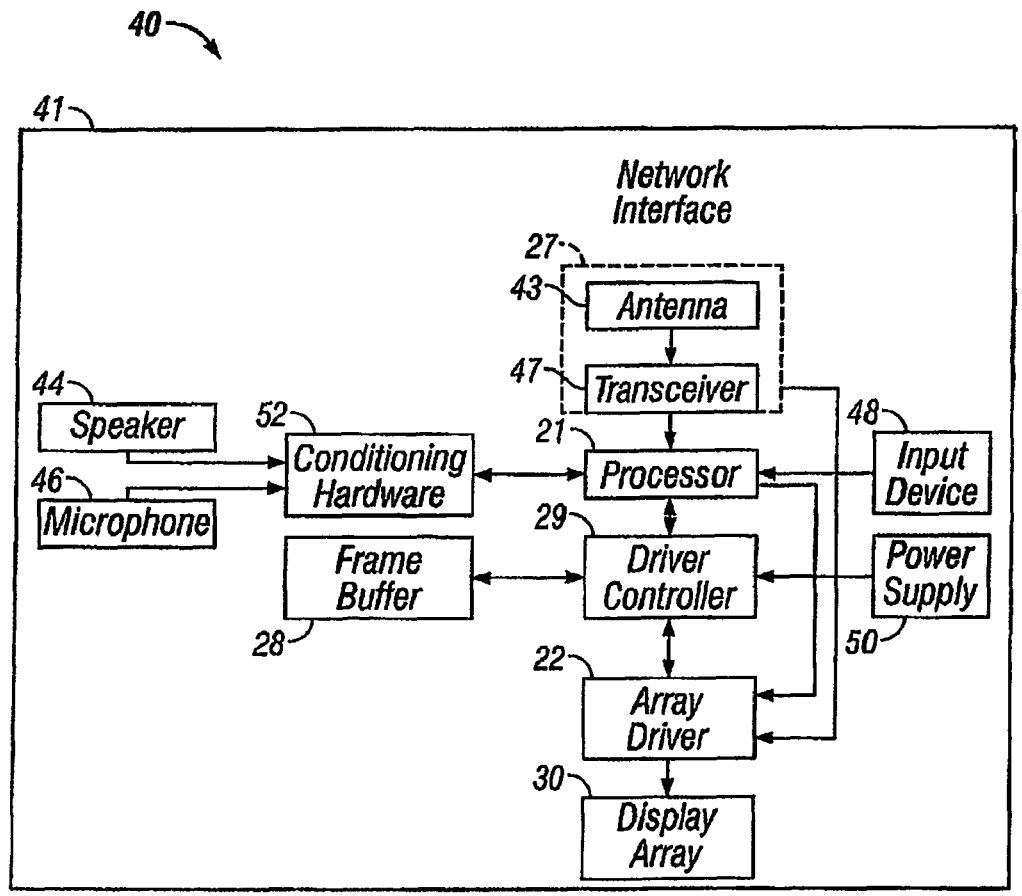

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 44, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUE-TOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Figure 7A:
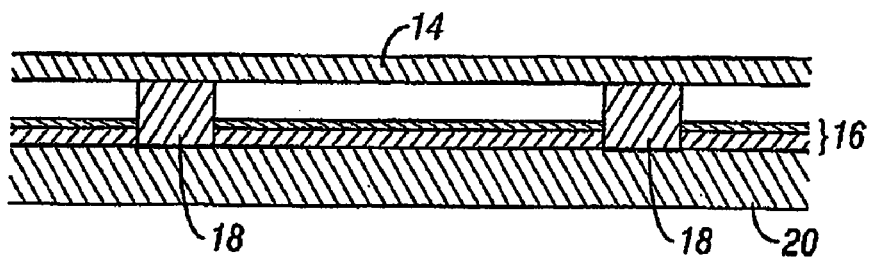
FIG. 7A is a cross section of the device of FIG. 1.
Figure 7B:
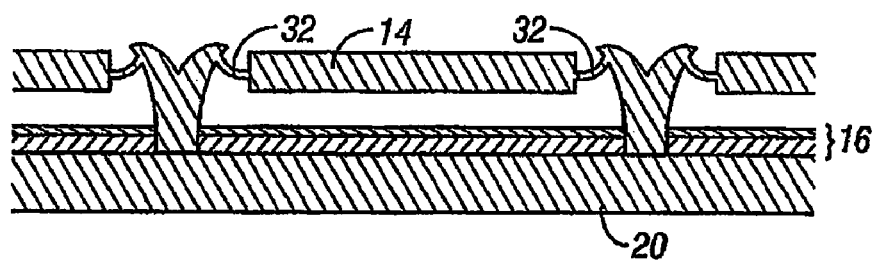
FIG. 7B is a cross section of an alternative embodiment of an interferometric modulator.
Figure 7C:
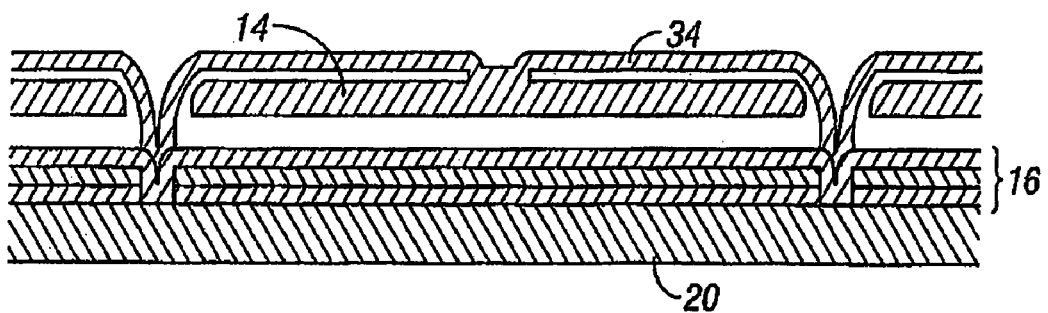
FIG. 7C is a cross section of another alternative embodiment of an interferometric modulator.
Figure 7D:
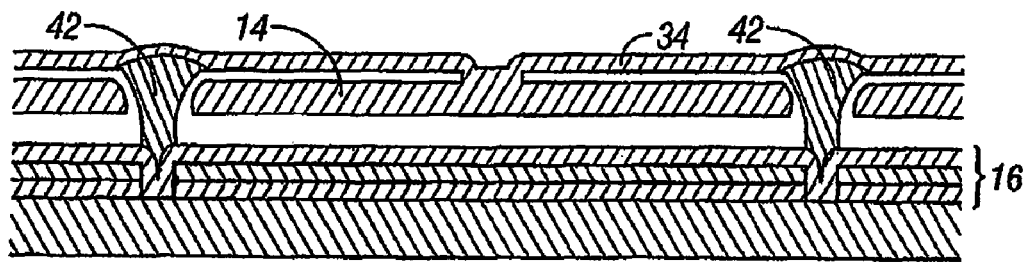
FIG. 7D is a cross section of yet another alternative embodiment of an interferometric modulator.
Figure 7E:
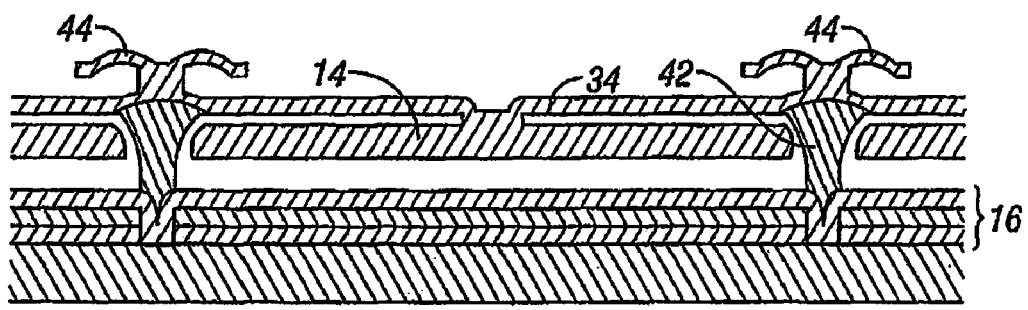
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the cavity, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. Such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

Figure 8:
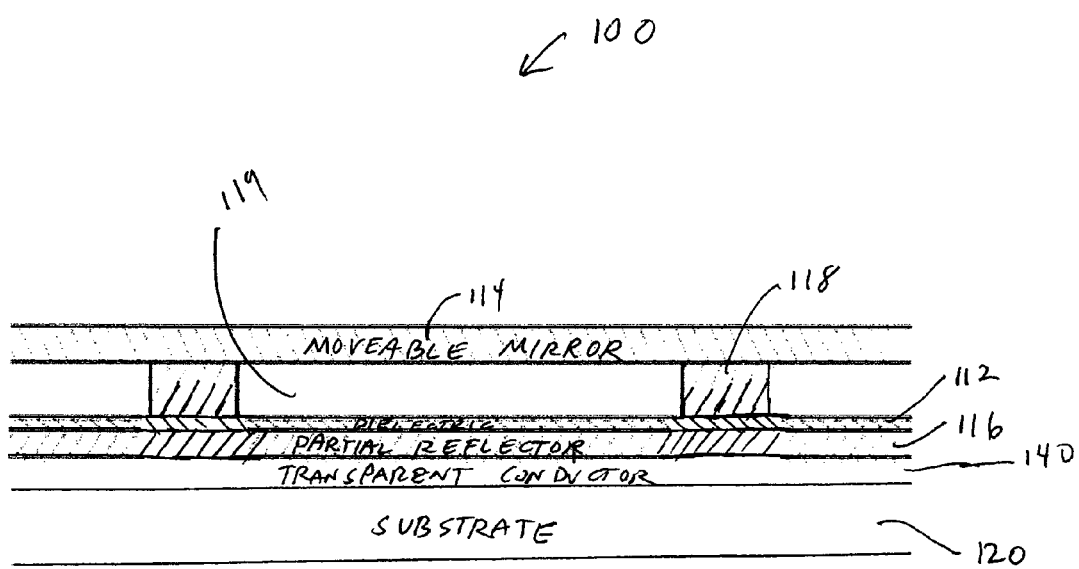
FIG. 8 is a cross-section of an exemplary interferometric modulator having a transparent conductor.

FIG. 8 is a cross-section of an exemplary interferometric modulator 100. The interferometric modulator 100 comprises a substrate 120, a transparent conductor 140, a partial reflector 116, a dielectric 112, a movable mirror 114, and supports 118. In the embodiment of FIG. 8, the supports 118 support moveable mirror 114 and define an air gap 119 between the dielectric layer 112 and the moveable mirror. In an advantageous embodiment, the air gap 119 is sized according to the desired optical characteristics of the interferometric modulator. For example, the air gap 119 may be sized in order to reflect a desired color from the interferometric modulator.

As described above with respect to FIGS. 7A, 7B, and 7C, typically a voltage difference is placed across the movable mirror 14 and the partial reflector 16 in order to actuate the interferometric modulator. Thus, in the embodiment of FIGS. 7A, 7B, and 7C, for example, the movable mirror 14 and the partial reflector 16 are at least partially conductive so that they may be connected to the row and column lines of the display device. In exemplary embodiments where the partial reflector 16 is also an electrode of the interferometric modulator (FIGS. 7A, 7B, and 7C, for example), the partial reflector may comprise chromium, titanium, and/or molybdenum.

In the exemplary interferometric modulator 100, the transparent conductor 140 is shown positioned between the partial reflector 116 and the substrate 120. In this embodiment, the transparent conductor 140 is configured as an electrode of the interferometric modulator and, thus, the interferometric modulator 100 may be actuated by placing an appropriate voltage difference, e.g., 10 volts, between the moveable mirror 114 and the transparent conductor 140. In an exemplary embodiment, the transparent conductor 140 comprises Indium Tin Oxide (ITO), Zinc Oxide, Florine doped Zinc Oxide, Cadmium Tin Oxide, Aluminum doped Zinc Oxide, Florine doped Tin Oxide, and/or Zinc Oxide doped with Gallium, Boron or Indium. In this embodiment, the partial reflector 116 is not required to be conductive and, thus, the partial reflector 116 may comprise any suitable partially reflective material, either conductive or nonconductive.

In certain embodiments of interferometric modulator, a reflectivity of the partial reflector 116 is within the range of about 30-36%. For example, in one embodiment the reflectivity of the partial reflector 116 is about 31%. In other embodiments, other reflectivities are usable in connection with the systems and methods described herein. In other embodiments, the reflectivity of the partial reflector 116 may be set to other levels according to the desired output criteria for the interferometric modulator 100. In a typical interferometric modulator, as a thickness of the partial reflector increases, the reflectivity of the partial reflector also increases, thus reducing the effectiveness of a dark state and limiting the contrast of the interferometric modulator. Therefore, in order to achieve a desired reflectivity of the partial reflector, in many embodiments reduction of a thickness of a partial reflector is desired.

In the embodiment of FIG. 8, the partial reflector 116 may advantageously be thinner due to the fact that the transparent conductor 140 serves as the electrode. Thus, the partial reflector does not need to be conductive, because the transparent conductor serves as the electrode. Accordingly, in embodiments including a transparent conductor, such as transparent conductor 140, a thickness of a partial reflector may be reduced in order to achieve a desired reflectivity. In one embodiment, the partial reflector 116 has a thickness of about 75 Angstoms. In another embodiment, the partial reflector 116 has a thickness in the range of about 60-100 Angstroms. In yet another embodiment, the partial reflector 116 has a thickness in the range of about 40-150 Angstroms.

In one embodiment, the partial reflector comprises silicon nitride, which is a non-conductive, partially reflective material. In other embodiments, oxides of chromium are used, including, but not limited to, CrO2, CrO3, Cr2O3, Cr2O, and CrOCN. In some embodiments, low conductivity dielectric materials are used as the partial reflector. These low conductivity dielectric materials are generally referred to as "high-k dielectrics", where "high-k dielectrics" refers to materials having a dielectric constant greater than or equal to about 3.9. High-k dielectrics may include, for example, SiO2, Si3N4, Al2O3, Y2O3, La2O3, Ta2O5, TiO2, HfO2, and ZrO2, for example.

In other embodiments, the partial reflector 116 comprises a dielectric stack having alternating layers of dielectrics with different indices of refraction. As those of skill in the art will recognize, the output characteristics of the interferometric modulator 100, e.g., the color of light that is reflected from the interferometric modulator 100, are affected by the reflectivity of the partial reflector 116. Accordingly, tuning of the reflectivity of the partial reflector 116 may be performed in order to achieve desired output characteristics. In one embodiment, the index of refraction of the partial reflector 116 can be fine-tuned by using a partial reflector 116 comprising a combination of dielectric materials in a stack structure. For example, in one embodiment, the partial reflector 116 may comprise a layer of SiO2 and a layer of CrOCN. In an exemplary embodiment of an interferometric modulator having a partial reflector comprising a dielectric stack, the material layers above substrate 120 include a layer of ITO that is about 500 Angstroms thick, a layer of SiO2 that is about 1000 Angstroms thick, a layer of CrOCN that is about 110 Angstroms thick, a layer of SiO2 that is about 275 Angstroms thick, an air gap that is about 2000 Angstroms thick, and an Al reflector. Thus, in this exemplary embodiment, the partial reflector comprises a layer of SiO2 that is about 1000 Angstroms thick and a layer of CrOCN that is about 110 Angstroms thick. Those of skill in the art will recognize that there are many other suitable conductive or non-conductive materials that may be used alone, or in combination with other materials, as part of the partial reflector 116. Use of these materials in combination with the systems and methods described herein is expressly contemplated.

In a typical display, as a capacitance of the individual display elements, e.g., interferometric modulators, increases, a power required to change voltages across the display elements also increases. For example, as a capacitance of any actuated display elements in an interferometric modulator display increases, the current required to change voltage levels on the columns of the display also increases. Accordingly, display elements with reduced capacitance are desired. The display elements of FIGS. 9 and 10 are exemplary embodiments of display elements having reduced capacitance.

Figure 9:
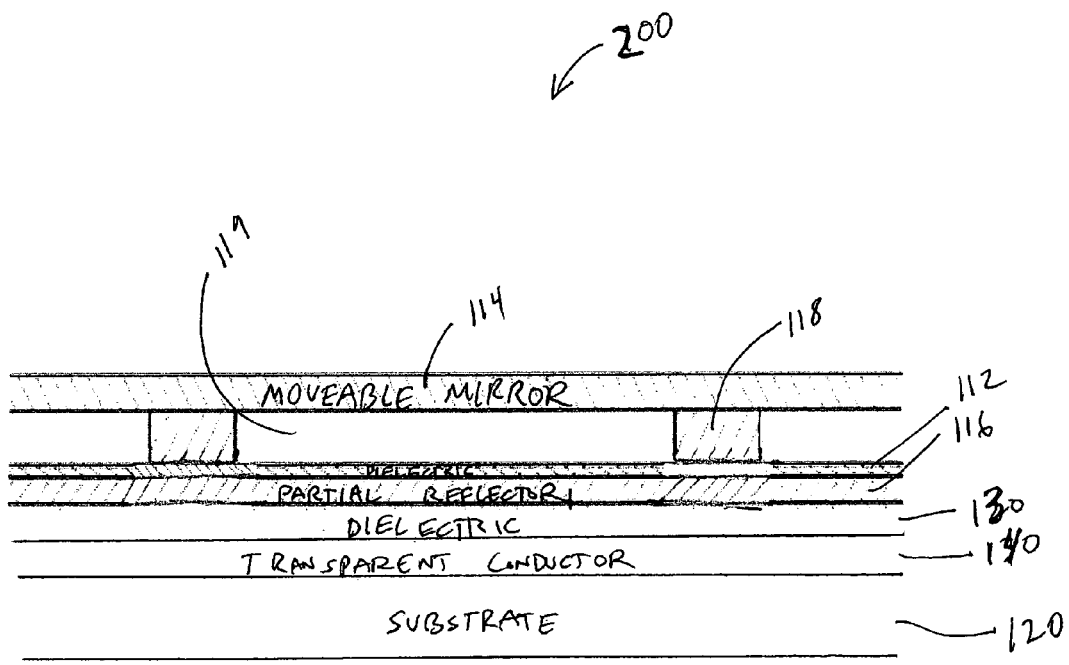
FIG. 9 is a cross-sectional view of an exemplary reduced capacitance interferometric modulator.

FIG. 9 is a cross-sectional view of a reduced capacitance interferometric modulator 200. The interferometric modulator 200 of FIG. 9 comprises the substrate 120, the transparent conductor 140, a dielectric 130, the partial reflector 116, the dielectric 112, movable mirror 114, supports 118, and air gap 119. In an exemplary embodiment, the relative thicknesses of these layers are selected so that a thickness of the air gap 119 is larger than a combined thickness of the partial reflector 116, the dielectric 112, and the dielectric 130. In the embodiment of FIG. 9, a lower capacitance is achieved by de-coupling the partial reflector 116 from the transparent conductor 140, thus increasing a distance between electrodes (e.g., moveable mirror 114 and transparent conductor 140) of the interferometric modulator. More particularly, in the embodiment of FIG. 9, the additional dielectric 130 is positioned between the transparent conductor 140 and the partial reflector 116. The addition of the dielectric 130 does not change a distance between the partial reflector 116 and the movable mirror 114, but does, however, increase the distance between the transparent conductor 140 and the movable mirror 114. In one embodiment, the dielectric 130 has a thickness of about 1,000 Angstroms. In other embodiments, the dielectric 130 may have a thickness in the range of about 800-3,000 Angstroms.

As described above with respect to FIG. 8, for example, interferometric modulator embodiments including a transparent conductor 140 may be actuated by placing a voltage between the transparent conductor 140 and the movable mirror 114. In the exemplary embodiment of FIG. 9, when the movable mirror 114 collapses against dielectric layer 112, the resulting distance between the movable mirror 114 and the energized transparent conductor 140 is increased by the thickness of dielectric layer 130. Because capacitance varies inversely to a distance separating capacitive electrodes, by increasing a distance between the electrodes of the interferometric modulator 200, a capacitance of the interferometric modulator 200 is correspondingly decreased. Thus, the addition of the dielectric 130 does not significantly affect the optical characteristics of the interferometric modulator 200, but does decrease a capacitance between the electrodes, e.g., the movable mirror 114 and the transparent conductor 140.

Figure 10:
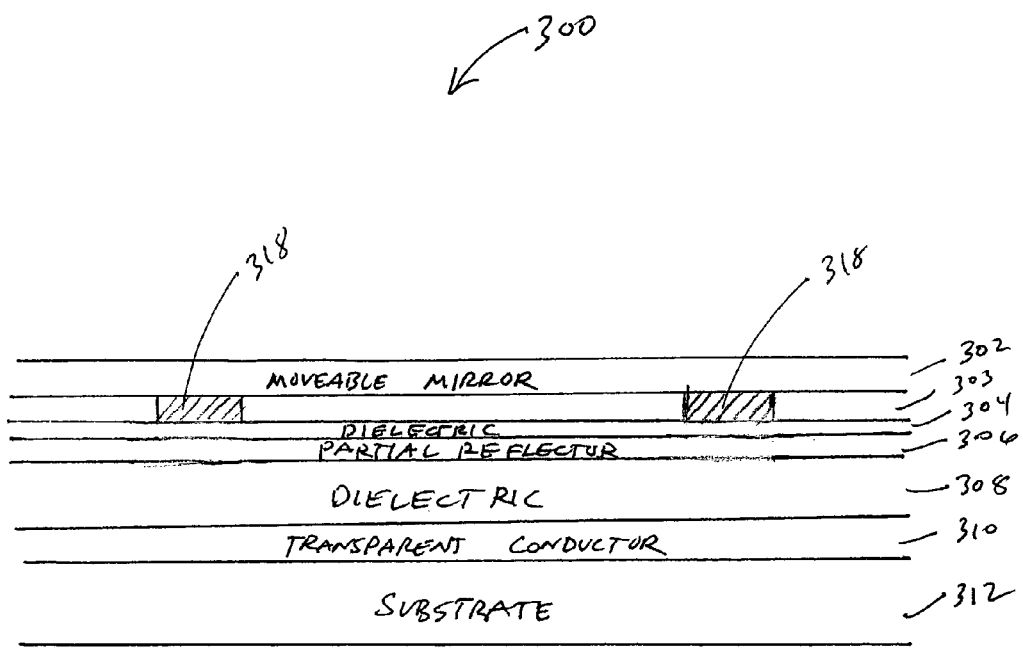
FIG. 10 is a cross-sectional view of another exemplary reduced capacitance interferometric modulator.

FIG. 10 is a cross-sectional view of an exemplary reduced capacitance interferometric modulator 300. The interferometric modulator 300 of FIG. 10 comprises a substrate 312, a transparent conductor 310, a dielectric 308, a partial reflector 306, a dielectric 304, a movable mirror 302, supports 318, and an air gap 303. In the embodiment of FIG. 10, the movable mirror 302 and the partial reflector 306 are separated by the dielectric layer 304 and an air gap 303. In this embodiment, the air gap 303 and dielectric 308 are sized so that in the released state, e.g., the state shown in FIG. 10, the interferometric modulator 300 absorb substantially all light incident on the substrate 312 so that a viewer sees the interferometric modulator 300 as black. When the interferometric modulator 300 is actuated, e.g., the movable mirror 302 is collapsed so that it contacts the dielectric 304, the interferometric modulator 300 reflects substantially all wavelengths of incident light so that the interferometric modulator 300 appears white to a viewer. In certain embodiments, reflection of substantially all wavelengths of light provides white light that is referred to as "broadband white." Due to the fact that the interferometric modulator 300 operates in a reverse manner when compared to the interferometric modulators 100 and 200 (e.g. the interferometric modulator 300 produces color or white in the released state and black in the actuated state), the interferometric modulator 300 is referred to as a "reverse interferometric modulator."

In one embodiment, an optical gap (including the air gap 303 and the dielectric 306) of the reverse interferometric modulator 300 is much smaller than an optical gap of an interferometric modulator that produces black in an actuated state and color or white in a released state (e.g., FIG. 10). For example, the dielectric 304 may have a thickness of less than about 150 Angstroms and the air gap 304 may have a thickness of about 1,400 Angstroms, while the interferometric modulator 100 may have a dielectric thickness in the range of about 350 to 850 Angstroms and an air gap in the range of about 2,000-3,000 Angstroms. Thus, reverse interferometric modulators, such as the interferometric modulator 300, have smaller optical gaps than regular interferometric modulators and, accordingly, the electrodes of reverse interferometric modulators are generally closer together. In the exemplary embodiment of FIG. 10, the distance between the moveable mirror 302 and the partial reflector 306 is in the range of about 150 to 200 Angstroms when the interferometric modulator 300 is in a collapsed position. This distance comprises the thickness of the dielectric 304 (about 150 Angstroms in the embodiment of FIG. 10) and a small gap of about 0-50 Angstroms that is present because the moveable mirror 302 and dielectric 304 may not be intimately contacting one another in the collapsed position. In other reverse interferometric modulators, the optical gap and distance between electrodes may be greater or smaller than the figures introduced above.

Due to the decreased distance between electrodes, the capacitance of reverse interferometric modulators is generally higher than regular interferometric modulators. Accordingly, reverse interferometric modulators may consume additional power when changing voltages across their row and/or column terminals. In order to reduce the capacitance of the reverse interferometric modulator 300, the dielectric layer 308 is positioned between the terminals of the interferometric modulator. For example, the interferometric modulator 300 includes a dielectric 308 adjacent to the transparent conductor 310. In the same manner as discussed above with respect to FIG. 9, for example, addition of the dielectric 308 does not affect a distance between the partial reflector 306 and the movable mirror 302, but does, however increase the distance between the transparent conductor 310 and the movable mirror 302, thus decreasing a capacitance of the interferometric modulator 300. Accordingly, a capacitance of the reverse interferometric modulator 300 may be significantly reduced with the addition of the dielectric layer 308 between the electrodes of the interferometric modulator.

The interferometric modulators 100, 200, and 300 each include a movable mirror (mirror 114 in FIGS. 8 and 9, and mirror 302 in FIG. 10). These exemplary moveable mirrors are deformable so that they collapse against the dielectric 112 (FIGS. 8 and 9), 304 (FIG. 10) when an appropriate voltage is present across the terminals of the interferometric modulators. Those of skill in the art will recognize, however, that the improvements described above with respect to FIGS. 8, 9, and 10, may be implemented in other embodiments of interferometric modulators having differently configured movable mirrors. For example, the interferometric modulators 100, 200, and 300, may be modified to have moveable mirrors that are attached to supports at the corners only, such as by tethers (e.g., FIG. 7B) or may have moveable mirrors suspended from deformable layers (e.g., FIG. 7C). Use of the improved systems and methods described with respect to FIGS. 7, 8, and 9, are expressly contemplated with these other configurations of movable mirrors.

Various embodiments of the invention have been described above. Although this invention has been described with reference to these specific embodiments, the descriptions are intended to be illustrative of the invention and are not intended to be limiting. Various modifications and applications may occur to those skilled in the art without departing from the true spirit and scope of the invention.

What is claimed is:

1. A display element comprising:
   a substantially transparent conductive layer;
   a partially reflective insulator having a thickness of between about 40 and 150 Angstroms;
   a moveable reflective layer, the partially reflective insulator being positioned between the conductive layer and the moveable reflective layer, wherein a voltage applied between the conductive layer and the moveable reflective layer induces movement of the moveable reflective layer; and
   a dielectric layer positioned between the conductive layer and the partially reflective insulator, wherein a capacitance of the display element is reduced compared to a display element without the dielectric layer.

2. The display element of claim 1, wherein when the voltage is applied between the conductive layer and the moveable reflective layer, at least a portion of the moveable reflective layer moves so that the at least a portion of the moveable reflective layer physically contacts the partially reflective insulator.

3. The display element of claim 1, further comprising: a thin dielectric layer positioned between the partially reflective insulator and the moveable reflective layer.

4. The display element of claim 1, wherein the dielectric layer comprises a material selected from the group consisting of: $SiO_2$, $Al_2O_3$, and Silicon Nitride.

5. The display element of claim 1, wherein the partially reflective insulator comprises a material selected from the group consisting of: Silicon Nitride, $CrO_2$, $CrO_3$, $Cr_2O_3$, $Cr_2O$, and CrOCN.

6. The display element of claim 1, further comprising a circuit configured to drive the moveable reflective layer such that light reflected by the moveable reflective layer and the partially reflective insulator can be modulated so as to form part of a viewable image.

7. The display element of claim 6, wherein the display element comprises a display element in a reflective display.

8. The display element of claim 1, wherein the display element is included with a plurality of other display elements to form an image by selectively modulating incident light.

9. The display element of claim 1, wherein the moveable reflective layer comprises a metal.

10. A display system comprising:
    a display comprising a plurality of display elements, each of the display elements comprising
       a substantially transparent conductive layer;
       a partially reflective non-conductive layer having a thickness of between about 40 and 150 Angstroms; and
       a moveable reflective layer, the partially reflective non-conductive layer being positioned between the conductive layer and the moveable reflective layer, wherein a voltage applied between the conductive layer and the moveable reflective layer induces movement of the moveable reflective layer;
    a processor that is in electrical communication with the display, the processor being configured to process image data; and
    a memory device in electrical communication with the processor.

11. The display system as recited in claim 10, further comprising:
    a first controller configured to send at least one signal to the display; and a second controller configured to send at least a portion of the image data to the first controller.

12. The display system as recited in claim 10, further comprising:
an image source module configured to send the image data to the processor.

13. The display system as recited in claim 12, wherein the image source module comprises at least one of a receiver, a transceiver, and a transmitter.

14. The display system as recited in claim 10, further comprising:
an input device configured to receive input data and to communicate the input data to the processor.

15. The display system of claim 10, wherein the plurality of display elements comprises a plurality of interferometric modulators.

16. The display system of claim 10, further comprising a circuit configured to drive the moveable reflective layer such that light reflected by the moveable reflective layer and the partially reflective non-conductive layer can be modulated so as to form part of a viewable image.

17. The display system of claim 16, wherein the display comprises a reflective display.

18. The display system of claim 10, wherein the plurality of display elements are configured to form an image by selectively modulating incident light.

19. The display system of claim 10, wherein the moveable reflective layer comprises a metal.

20. The display system of claim 10, wherein the partially reflective non-conductive layer comprises a material selected from the group consisting of: Silicon Nitride, $CrO_2$, $CrO_3$, $Cr_2O_3$, $Cr_2O$, and CrOCN.

21. A display element comprising:
a substantially transparent conductive layer;
a dielectric layer;
a partially reflective layer, wherein the dielectric layer is positioned between the conductive layer and the partially reflective layer; and
a moveable reflective layer, the partially reflective layer being positioned between the conductive layer and the moveable reflective layer, wherein
a voltage applied between the conductive layer and the moveable reflective layer induces movement of the moveable reflective layer; and
a capacitance of the display element is reduced compared to a display element without the dielectric layer.

22. The display element of claim 21, wherein the dielectric layer has a thickness of between about 800 and 3,000 Angstroms.

23. The display element of claim 21, wherein the partially reflective layer is conductive.

24. The display element of claim 21, wherein the partially reflective layer is substantially non-conductive.

25. The display element of claim 21, further comprising another dielectric layer positioned between the partially reflective layer and the moveable reflective layer.

26. The display element of claim 21, further comprising a circuit configured to drive the moveable reflective layer such that light reflected by the moveable reflective layer and the partially reflective layer can be modulated so as to form part of a viewable image.

27. The display element of claim 26, wherein the display element comprises a display element in a reflective display.

28. The display element of claim 21, wherein the display element is included with a plurality of other display elements to form an image by selectively modulating incident light.

29. The display element of claim 21, wherein the moveable reflective layer comprises a metal.

30. The display element of claim 21, wherein the dielectric layer comprises a material selected from the group consisting of: $SiO_2$, $Al_2O_3$, and Silicon Nitride.

31. The display element of claim 21, wherein the partially reflective layer comprises a material selected from the group consisting of: Silicon Nitride, $CrO_2$, $CrO_3$, $Cr_2O_3$, $Cr_2O$, and CrOCN.

32. A display element comprising:
a substantially transparent conductive layer;
a dielectric layer;
a partially reflective layer, the dielectric layer being positioned between the conductive layer and the partially reflective layer; and
a moveable reflective layer, the moveable reflective layer being separated from the partially reflective layer by a gap, wherein when the display element is in an actuated state, the display element appears white to a viewer and in a released state the display element appears non-white to the viewer.

33. The display element of claim 32, wherein the gap is sized so that in the released state the display element appears at least one of black, blue, green, and red.

34. The display element of claim 32, wherein the partially reflective layer is substantially non-conductive.

35. The display element of claim 32, wherein the partially reflective layer has a thickness of between about 40 and 150 Angstroms.

36. The display element of claim 32, wherein the dielectric layer has a thickness of between about 800 and 3,000 Angstroms.

37. The display element of claim 32, wherein a distance between the partially reflective layer and the reflective layer when the display element is in the actuated state is less than about 200 Angstroms.

38. The display element of claim 37, wherein a distance between the partially reflective layer and the reflective layer when the display element is in the released state is less than about 1,550 Angstroms.

39. The display element of claim 32, further comprising an additional dielectric layer positioned between the partially reflective layer and the moveable reflective layer,
wherein a thickness of the dielectric layer is less than about 150 Angstroms.

40. The display element of claim 32, further comprising a circuit configured to drive the moveable reflective layer such that light reflected by the moveable reflective layer and the partially reflective layer can be modulated so as to form part of a viewable image.

41. The display element of claim 40, wherein the display element comprises a display element in a reflective display.

42. The display element of claim 32, wherein the display element is included with a plurality of other display elements to form an image by selectively modulating incident light.

43. The display element of claim 32, wherein the movable reflective layer comprises a metal.

44. The display element of claim 32, wherein the dielectric layer comprises a material selected from the group consisting of: $SiO_2$, $Al_2O_3$, and Silicon Nitride.

45. The display element of claim 32, wherein the partially reflective layer comprises a material selected from the group consisting of: Silicon Nitride, $CrO_2$, $CrO_3$, $Cr_2O_3$, $Cr_2O$, and CrOCN.

* * * * *